United States Patent Office 3,384,663
Patented May 21, 1968

3,384,663
5-TERTIARYAMINOALKYLIDENE DIBENZOCY-CLOHEPTADIENE COMPOUNDS, AND SALTS THEREOF
Gérald Rey-Bellet and Hans Spiegelberg, Basel, Switzerland, assignors to Hoffmann-La Roche Inc., Nutley, N.J., a corporation of New Jersey
No Drawing. Original application Mar. 27, 1959, Ser. No. 802,298. Divided and this application Oct. 27, 1967, Ser. No. 678,552
13 Claims. (Cl. 260—570.8)

ABSTRACT OF THE DISCLOSURE

5 - (ω - tertiaryaminopropylidene) - dibenzo[a,e]cyclohepta[1,5]dienes, such as amitriptyline, are prepared via dehydration of 5-hydroxy-5-(ω-tertiaryaminopropyl)-dibenzo[a,e]cyclohepta[1,5]dienes. The latter intermediates are prepared from dibenzo[a,e]cyclohepta[1,5]-dien-5-ones via a Grignard reaction and hydrolysis of the condensation product. Catalytic hydrogenation of the propylidene compound yields corresponding ω-tertiaryaminopropyl compounds. The compounds having the ω-tertiarylaminopropyl or ω - tertiaryaminopylidene side chain are useful as narcosis-potentiating, adrenolytic, sedative, antihistaminic, antiemetic, antipyretic and hypothermic agents.

Cross reference to related applications

This application is a division of Ser. No. 802,298, filed Mar. 27, 1959.

Detailed description of the invention

This invention relates to novel chemical products and to novel processes for making the same.

In one comprehensive embodiment, the product aspect of the invention relates to compounds having the formula

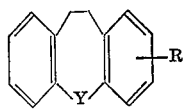
I wherein Y represents a divalent radical selected from the group consisting of

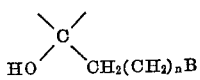

and

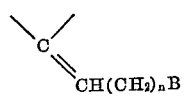

and

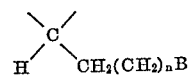

B represents a tertiary amino radical,
R is hydrogen, bromine or chlorine and
n represents an integer from 2 to 6, inclusive;
to acid addition salts with pharmaceutically acceptable acids of said compounds having the above general Formula I; and to quaternary salts with pharmaceutically acceptable quaternizing agents of said compounds having the above general Formula I. Exemplary, but not limitative, of pharmaceutically acceptable acids are inorganic acids (e.g., hydrochloric, hydrobromic, sulfuric and phosphoric acids) and organic acids (e.g., acetic, oxalic, citric, lactic, tartaric and ethane-sulfonic acids). Exemplary, but not limitative, of pharmaceutically acceptable quaternizing agents are esters of lower alkanols and aralkanols with mineral acids (e.g., methyl bromide, ethyl iodide, dimethylsulfate, benzyl bromide), esters of lower alkanols and aralkanols with sulfonic acids (e.g., ethyl p-toluenesulfonate), and the like. Exemplary, but not limitative, of tertiary amino radicals represented by the symbol B are di(lower alkyl) amino (e.g., dimethylamino, diethylamino and the like), piperidino, morpholino, pyrrolidino, and the like.

The novel products referred to in the preceding paragraph—i.e., the compounds of Formula I and the acid addition salts and quaternary salts—are characterized by manifold activity upon the central nervous system, and are useful as pharmacological and medicinal agents, more particularly as narcosis-potentiating, adrenolytic, sedative, antihistaminic, antiemetic, antipyretic and hypothermic agents.

The novel products referred to above can be made, by processes described below, from dibenzo[a,e]cyclohepta[1,5]dien-5-one, Formula II below:

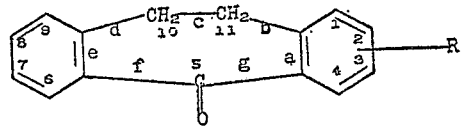
II wherein R is as defined above.

(The above Formula II is marked to indicate the system of numbering and lettering employed in the nomenclatures recited in the present specification.) The ketone of Formula II can be made by methods known per se. For example, these ketones can be made by reduction of the correspondingly substituted benzalphthalides and ring closure of the thus obtained dibenzyl-o-carboxylic acids.

In another comprehensive embodiment, a process aspect of the invention provides an overall method of making compounds included under Formula I above.

In this aspect, the invention relates to a process which comprises condensing a ketone having Formula II with an organometallic compound having the formula

X—CH₂(CH₂)ₙB    III wherein the symbols n and B have the same meaning defined above in connection with Formula I, and X represents a member selected from the group consisting of magnesium halide, zinc halide and lithium, and hydrolyzing the metal-containing condensation product obtained, thereby producing a tertiary alcohol having the formula

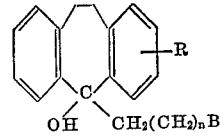
IV wherein the symbols n, R and B have the same meaning defined above in connection with Formula I, treating said tertiary alcohol with a dehydrating agent, thereby producing a semicyclically unsaturated compound having the formula

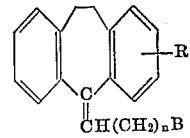
V wherein the symbols n, R and B have the same meaning defined above in connection with Formula I, and catalytically hydrogenating said semicyclically unsaturated compound, thereby producing a compound having the formula

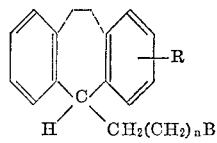

VI wherein the symbols n, R and B have the same meaning defined above in connection with Formula I.

It will be appreciated from the foregoing that, in addition to the ketone starting material [i.e., (II)], it is also necessary to have available the starting material (III). The latter can be made by methods known per se. One preferred process of the invention employs, as a specific embodiment of reactant (III), a Grignard reagent made from a di(lower alkyl)amino (lower alkyl) halide. Such Grignard reagents can be made by direct reaction of metallic magnesium with an ethereal solution of the dialkylaminoalkyl halide referred to above. In such cases, it is preferred to employ a highly active form of magnesium. Conveniently, one can employ finely divided copper-magnesium alloy, e.g., that disclosed by Gilman, Recueil des Trav. Chim. des Pays Bas, 47, 19 (1928), the reaction being facilitated by addition of a suitable lower alkyl halide, e.g., methyl iodide, ethyl bromide or the like.

The first stage of the comprehensive process embodiment referred to above comprises condensing the ketone reactant (II) with the organometallic reactant (III) and hydrolyzing the condensation product. In a preferred mode of execution, the ketone reactant, either in solid finely pulverized form or in an inert organic liquid, e.g., absolute ether, benzene, tetrahydrofuran or the like, is added to the Grignard reagent of the tertiary amino alkyl halide in the same or a similar inert organic liquid. Upon completion of the condensation reaction, the metal-containing condensation product is subjected to hydrolytic decomposition. It is especially advantageous to decompose the metal-containing condensation product under practically neutral conditions, e.g., by hydrolysis in aqueous ammonium chloride solution. In this way, the tertiary alcohol product obtained, i.e., (IV), is obtained directly in free form, and can be separated from the by-products of the reaction and isolated by treatment with suitable water-immiscible organic solvents, e.g., ether, ethyl acetate, chloroform, methylene chloride or the like.

In a second state, which can be effected optionally, the tertiary alcohol product obtained in the first stage, i.e., a 5-basically substituted dibenzo[a,e]cyclohepta[1,5]dien-5-ol, can be subjected to a dehydration step. The dehydration is effected especially advantageously by heating with alcoholic hydrogen chloride. It can also be effected, however, with other conventional dehydrating agents, such as phosphorus oxychloride, sulfuric acid, zinc chloride, potassium bisulfate and the like.

In a further optional reaction stage, the semicyclically unsaturated compound obtained by the dehydration reaction above referred to, i.e., a compound of Formula V above can be subjected to a step of catalytic hydrogenation. The hydrogenation is most conveniently effected in the presence of Raney nickel.

In one preferred embodiment of its product aspect, the invention provides compounds represented by the formula

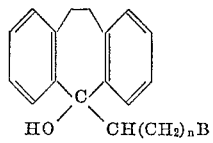

VII wherein the symbols n and B have the same meaning defined above in connection with Formula I, and nuclear halogen (for example, chlorine and bromine) substitution derivatives thereof wherein a halo substituent is solely present in a nuclear β- (i.e., 2-, 3-, 7- or 8-) position, and acid addition salts of each of the foregoing with pharmaceutically acceptable acids.

In another preferred embodiment, the invention provides compounds having the formula

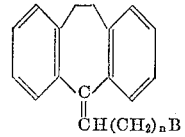

VIII wherein the symbols n and B have the same meaning defined above in connection with general Formula I, and nuclear halogen (for example, chlorine and bromine) substitution derivatives thereof wherein a halo substituent is solely present in a nuclear β- (i.e., 2-, 3-, 7- or 8-) position, and acid addition salts of each of the foregoing with pharmaceutically acceptable acids.

In still another preferred embodiment, the invention provides compounds having the formula

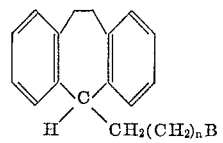

IX wherein the symbols n and B have the same meaning defined above in connection with general Formula I, and nuclear halogen (for example, chlorine and bromine) substitution derivatives thereof wherein a halo substituent is solely present in a nuclear β- (i.e., 2-, 3-, 7- or 8-) position, and acid addition salts of each of the foregoing with pharmaceutically acceptable acids.

The invention is further disclosed in the following examples, which are illustrative but not limitative thereof.

Example 1

In a one-liter, three-neck flask, fitted with a stirrer, dropping funnel and condenser, 2.5 g. of Gilman alloy (op. cit. supra) was covered with 10 cc. of dry ether and reacted with 0.5 cc. of methyl iodide.

After the vigorous reaction subsided somewhat, 7.5 g. of magnesium shavings were added in one portion and a solution of 40 g. of freshly distilled ω-dimethylaminopropyl chloride in 180 cc. of dry ether was added dropwise over a period of one hour. The reaction mixture was heated under reflux at 40° C. for five hours longer, and then was stirred overnight at room temperature.

On the following day, a solution of 21.2 g. of dibenzo[a,e]-cyclohepta[1,5]dien-5-one in 400 cc. of dry ether was added little by little, while stirring. The whole was then stirred 20 hours longer at 20–25° C. Then the reaction mixture was cooled with ice water and mixed with a cold saturated ammonium chloride solution. The organic layer was separated, the aqueous phase was extracted twice with 100 cc. portions of ether, and the combined ether layers were dried over sodium sulfate and evaporated. The residue, upon recrystallization from high boiling petroleum ether, yielded colorless crystals of 5-hydroxy - 5 - (ω - dimethylaminopropyl)dibenzo[a,e]cyclohepta[1,5]diene, melting at 118–119° C.

20 g. of 5-hydroxy-5-(ω-dimethylaminopropyl-dibenzo[a,e]cyclohepta[1,5]diene obtained was dissolved in 200 cc. of absolute alcohol, mixed with 20 cc. of 30 percent alcoholic hydrogen chloride solution, and the mixture was refluxed for 1½ hours. The alcohol was evaporated under diminished pressure and the residue was recrystallized from alcohol-ether. The 5-(ω-dimethylaminopropylidene)-dibenzo[a,e]cyclohepta[1,5]diene hydrochloride (amitriptyline hydrochloride) thus obtained formed colorless, water-soluble crystals, of M.P. 194–195° C.

16 g. of 5 - (ω - dimethylaminopropylidene) - dibenzo

[a,e])cyclohepta[1,5]diene hydrochloride was dissolved in a little water and the solution was made alkaline with aqueous sodium hydroxide solution, whereupon the free base precipitated. The latter was extracted by shaking with ethyl acetate, the extract was dried and the solvent was distilled off. The oily free base remained, and was dissolved in 100 cc. of alcohol and then hydrogenated in the presence of Raney nickel at 60–70° C., under a hydrogen pressure of 30 atmospheres gauge. Upon filtration of the reaction mixture, evaporation of the alcohol and distillation of the residue, there was obtained 5-(ω-dimethylaminopropyl)-dibenzo[a,e]cyclohepta[1,5]diene as a colorless oil, B.P 145° C./0.1 mm. Hg. The hydrochloride, upon recrystallization from alcohol-ether, melted at 181–182° C.

Example 2

In a one-liter, three-neck flask fitted with a stirrer, dropping funnel and condenser, 2.5 g. of Gilman alloy was covered with 10 cc. of dry ether and reacted with 0.5 cc. of methyl iodide.

After the vigorous reaction had subsided somewhat, 7.5 g. of magnesium shavings were added in a single portion, and a solution of 40 g. of freshly distilled ω-dimethylaminopropyl chloride in 180 cc. of dry ether was added dropwise over a period of an hour. The reaction mixture was refluxed at 40° C. for five hours longer and then was stirred overnight at room temperature.

On the following day, a solution of 24.75 g. of 3-chlorodibenzo[a,e]cyclohepta[1,5]dien-5-ones in 400 cc. of dry ether was slowly added, dropwise, while stirring. The whole was stirred for an additional period of 20 hours at 20–25° C. Then the reaction mixture was cooled with ice water and mixed with a cold saturated ammonium chloride solution. The organic layer was separated, the aqueous layer was extracted twice with 100 cc. portions of ether, and the combined ethereal portions were dried over sodium sulfate and evaporated. The residue, upon recrystallization from high boiling petroleum ether, yielded colorless crystals of 3-chloro-5-hydroxy-5-(ω-dimethylaminopropyl) - dibenzo[a,e]cyclohepta[1,5]diene, melting at 127–128° C.

10 g. of 3-chloro-5-hydroxy-5-(ω-dimethylaminopropyl)-dibenzo[a,e]cyclohepta[1,5]diene thus obtained was dissolved in 100 cc. of absolute alcohol, mixed with 10 cc. of 30% alcoholic hydrogen chloride solution, and heated at reflux for two hours. The residue obtained, upon evaporation of the alcohol under diminished pressure, was recrystallized from alcohol-ether. The 3-chloro-5-(ω-dimethylaminopropylidene) - dibenzo[a,e]cyclohepta[1,5]diene hydrochloride thus obtained formed colorless, water-soluble crystals, of M.P. 210–212° C.

The starting material, 3-chloro-dibenzo[a,e]cyclohepta-[1,5]dien-5-one, can be prepared as follows:

100 g. of phthalic anhydride, 137 g. of 4-chlorophenylacetic acid and 2.6 g. of freshly molten sodium acetate were mixed well in a 500 cc. round bottom flask, and the mixture was quickly heated in a sand bath to 230° C., and then was slowly heated over a period of two hours to 240° C., and finally was kept at 240° C. until water no longer distilled off. The mixture was cooled, whereupon it became solid. It was then recrystallized from a large quantity of absolute alcohol, whereupon 4-chlorobenzal phthalide, of M.P. 151–152° C., was obtained.

A mixture of 51.3 g. of 4-chlorobenzal phthalide, 100 cc. of hydriodic acid ($d=1.7$) and 18 g. of red phosphorus was refluxed for 15 hours. The reaction mixture was cooled and then was mixed with sufficient water and methylene chloride that all the material, with the exception of the red phosphorus, went into solution. The methylene chloride layer was separated, washed with water, and was then extracted several times with 5% aqueous sodium carbonate solution. Upon acidification of the combined aqueous phases with hydrochloric acid, 4-chloro-dibenzyl-2'-carboxylic acid precipitated, and the latter was extracted with methylene chloride. Upon drying and evaporation of the methylene chloride solution, the residual 4-chloro-dibenzyl-2'-carboxylic acid obtained was recrystallized from high boiling petroleum ether and then had a melting point of 129–130° C.

To 270 g. of well stirred polyphosphoric acid, heated to 170° C., was added portionwise, over a period of two hours, 57.6 g. of 4-chloro-dibenzyl-2'-carboxylic acid. The reaction mixture was stirred at 170° C. for three hours longer, then was poured onto ice and the reaction product was extracted by shaking with ether. The ethereal solution was washed with aqueous sodium carbonate and solution, then with water, then was dried over sodium sulfate and evaporated. The product, 3-chloro-dibenzo-[a,e]-cyclohepta[1,5]dien-5-one, was purified by distillation (B.P. 150–155° C./0.05 mm. Hg) and then by recrystallization from high boiling petroleum ether, whereupon it had M.P. 64–65° C.

Example 3

In a two-liter, three-neck flask fitted with stirrer, droppin funnel atnd condenser, 5 g. of Gilman alloy were covered with 20 ml. of dry ether and reacted with 1 cc. of methyl iodide.

After the vigorous reaction had subsided somewhat, 15 g. of magnesium shavings were added in a single portion and a solution of 70 g. of freshly distilled ω-piperidinopropyl chloride in 360 cc. of dry ether was added dropwise over a period of an hour. The reaction mixture was refluxed at 40° C. for an additional period of six hours and then stirred overnight at room temperature.

On the following day, a solution of 42.4 g. of dibenzo-[a,e]-cyclohepta[1,5]dien-5-one in 600 cc. of dry ether was slowly added dropwise. The whole was then stirred for an additional period of 18 hours at 20–25° C. Then, the reaction mixture was cooled with ice water, mixed with a cold saturated ammonium chloride solution and filtered. The main fraction of the reaction product was extracted with methylene chloride from the solid residue and a little additional substance was obtained by concentrating the organic layer.

After recrystallization from absolute ethanol, the 5-hydroxy - 5 - (ω - piperidinopropyl) - dibenzo[a,e]cyclohepta[1,5]diene was obtained as colorless crystals melting at 167–168°.

27 g. of the thus obtained 5-hydroxy-5-(ω-piperidinopropyl)-dibenzo[a,e]cyclohepta[1,5]diene were dissolved in 270 cc. of absolute alcohol, mixed with 27 cc. of 30% alcoholic hydrogen chloride solution, and refluxed for three hours on a steam bath. The residue obtained, upon evaporation of the alcohol under diminished pressure was recrystallized from alcohol-ether. The product thus obtained,(ω-piperidinopropylidene) - dibenzo[a,e]cyclohepta[1,5]diene hydrochloride, melted at 213–214° C.

What is claimed is:

1. A compound selected from the group consisting of compounds of the formula

and acid addition salts thereof with pharmaceutically acceptable acids and quaternary salts thereof; wherein Y is

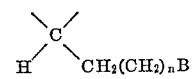

or

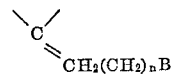

R is hydrogen, bromine or chlorine; B is di(lower alkyl)amino; and n is an integer from 2 to 6, inclusive.

2. A compound as in claim 1 wherein n is 2.

3. A compound as in claim 2 wherein R is hydrogen.

4. A compound as in claim 3 which is 5-(ω-dimethylaminopropylidene)-dibenzo[a,e]cyclohepta[1,5]diene.

5. A compound as in claim 3 which is 5-(ω-dimethylaminopropylidene)-dibenzo[a,e]cyclohepta[1,5]diene hydrochloride.

6. A compound as in claim 3 which is 5-(ω-dimethylaminopropyl)-dibenzo[a,e]cyclohepta[1,5]diene.

7. A compound as in claim 3 which is 5-(ω-dimethylaminopropyl) - dibenzo[a,e]cyclohepta[1,5]diene hydrochloride.

8. A compound as in claim 2 wherein R is bromine or chlorine and is in a β-nuclear position.

9. A compound as in claim 8 which is 3-chloro-5-(ω-dimethylaminopropylidene) - dibenzo[a,e]cyclohepta[1,5]diene.

10. A compound as in claim 8 which is 3-chloro-5-(ω-dimethylaminopropylidene) - dibenzo[a,e]cyclohepta[1,5]diene hydrochloride.

11. A compound selected from the group consisting of compounds of the formula

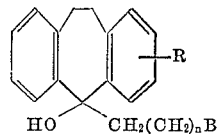

and acid addition salts thereof with pharmaceutically acceptable acids and quaternary salts thereof; wherein R is hydrogen, bromine or chlorine; B is di(lower alkyl)amino; and n is an integer from 2 to 6, inclusive.

12. A compound as in claim 11 which is 5-hydroxy-5-(ω - dimethylaminopropyl) - dibenzo[a,e]cyclohepta[1,5]diene.

13. A compound as in claim 11 which is 3-chloro-5-hydroxy - 5 - (ω - dimethylaminopropyl) - dibenzo[a,e]cyclohepta[1,5]diene.

References Cited
FOREIGN PATENTS 858,186  1/1961  Great Britain.

CHARLES B. PARKER, *Primary Examiner.*

ROBERT V. HINES, *Examiner.*

UNITED STATES PATENT OFFICE
CERTIFICATE OF CORRECTION

Patent No. 3,384,663                        May 21, 1968

Gérald Rey-Bellet et al.

It is hereby certified that error appears in the above numbered patent requiring correction and that the said Letters Patent should read as corrected below.

In the heading to the printed specification, between lines 10 and 11, insert -- Claims priority, application Switzerland, Apr. 3, 1958 57,958 --. Column 1, line 23, "tertiarylaminopropyl" shoud read -- tertiaryaminopropyl --; line 23, "tertiaryaminopylidene" should read -- tertiaryaminopropylidene --. Column 4, line 65, "dimethylaminopropyl-" should read -- dimethylaminopropyl)- --. Column 5, line 1, "[a,e])cyclohepta" should read -- [a,e] cyclohepta --. Column 6, line 21, "pin" should read -- ping --; line 21, "atnd" should read -- and --; line 52, ", (ω-piperidino" should read -- , 5-(ω-piperidino --; lines 71 to 75, the formula should appear as shown below:

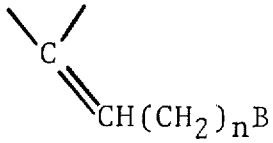

Signed and sealed this 11th day of November 1969.

(SEAL)
Attest:

EDWARD M. FLETCHER, JR.               WILLIAM E. SCHUYLER, JR.
Attesting Officer                        Commissioner of Patents